(12) United States Patent
Roberts

(10) Patent No.: US 8,151,459 B2
(45) Date of Patent: Apr. 10, 2012

(54) FORMING FIRTREE PROFILES

(75) Inventor: Michael C. Roberts, Bristol (GB)

(73) Assignee: Rolls-Royce PLC, London (GB)

( * ) Notice: Subject to any disclaimer, the term of this patent is extended or adjusted under 35 U.S.C. 154(b) by 1261 days.

(21) Appl. No.: 11/892,544

(22) Filed: Aug. 23, 2007

(65) Prior Publication Data

US 2008/0206060 A1   Aug. 28, 2008

(30) Foreign Application Priority Data

Oct. 4, 2006   (GB) .................................. 0619551.5

(51) Int. Cl.
*B23P 15/02* (2006.01)

(52) U.S. Cl. ................ 29/889.7; 416/219 R; 416/223 A

(58) Field of Classification Search ................. 29/69.15, 29/557, 889.1, 889.2, 889.7–889.722; 415/115; 416/219 R, 223 A, 223 R, 97 R
See application file for complete search history.

(56) References Cited

U.S. PATENT DOCUMENTS

| | | | | |
|---|---|---|---|---|
| 3,079,681 | A * | 3/1963 | Fentiman | 29/525 |
| 4,411,730 | A * | 10/1983 | Fishter et al. | 216/94 |
| 4,888,863 | A * | 12/1989 | Cox et al. | 29/889.7 |
| 6,909,988 | B2 * | 6/2005 | Batzinger et al. | 702/181 |
| 7,007,383 | B2 * | 3/2006 | Przybylski et al. | 29/889.7 |
| 2004/0064945 | A1 * | 4/2004 | Howley | 29/889.7 |
| 2004/0073401 | A1 * | 4/2004 | Batzinger et al. | 702/181 |
| 2004/0107572 | A1 * | 6/2004 | Przybylski et al. | 29/889.7 |
| 2006/0134454 | A1 * | 6/2006 | Sathian | 428/668 |

FOREIGN PATENT DOCUMENTS

| | | |
|---|---|---|
| CA | 1 317 444 | 5/1993 |
| CA | 2 502 593 | 9/2006 |
| DE | 42 03 656 A1 | 8/1993 |
| WO | WO 03/059569 A3 | 7/2003 |

* cited by examiner

*Primary Examiner* — David Bryant
*Assistant Examiner* — Jacob Cigna
(74) *Attorney, Agent, or Firm* — Oliff & Berridge, PLC

(57) ABSTRACT

A firtree profile, for example on a component of a gas turbine engine, is formed in a two-stage process. In one stage, an intermediate profile is formed, for example by a mechanical machining operation such as grinding. Subsequently, in a second stage, loaded flanks 16, 18 of the profile are formed by an electric discharge machining operation performed on the intermediate profile. Alternatively, the electric discharge machining operation may be performed first to create the intermediate profile, and subsequently transition regions, such as fillets 24, 28, may be formed in a mechanical or chemical material removing operation. In the resulting profile, surfaces, such as the loaded flanks 16, 18, which must be finished to tight tolerances, but which are subjected to relatively low bending stresses, are formed by the electric discharge machining operation, which leaves a re-cast layer 36. In regions subjected to higher bending stress, such as regions 34 of the fillets 26, 28, are formed by mechanical or chemical metal removal techniques, and so do not have the re-cast layer 36.

10 Claims, 1 Drawing Sheet

FORMING FIRTREE PROFILES

Figure 1:
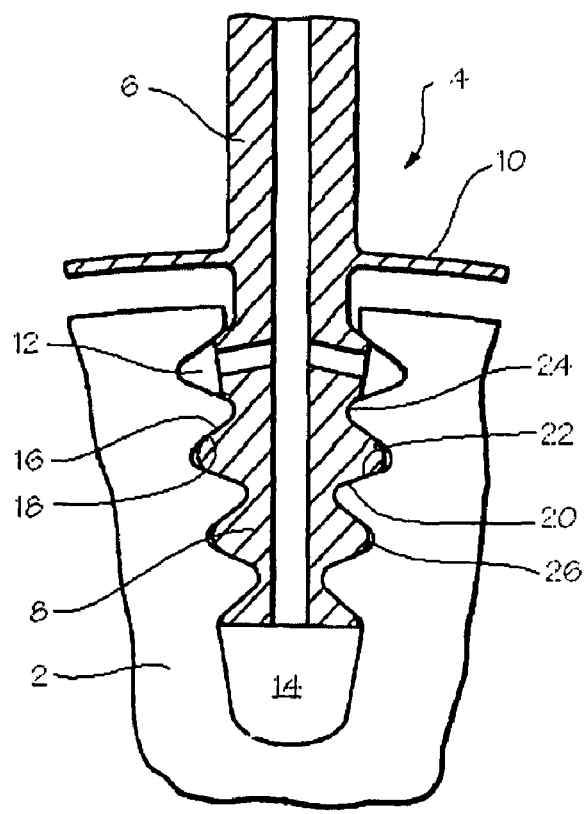

This invention relates to the formation of firtree profiles, and is concerned particularly, although not exclusively, with the formation of firtree profiles on or in components of a gas turbine engine, such as turbine blades and discs for receiving such blades.

It is known for turbine blades to be fitted to turbine discs by means of cooperating firtree profiles. Such fixing methods provide accurate location of the blade with respect to the disc. Firtree profiles are sufficiently strong to withstand the radially outward forces imposed on the blade during rotation of the disc in operation of the engine in which it is installed. In operation, flanks of the profiles which face away from the engine axis on the blades, and towards the axis on the discs, support the blades against radially outward movement, and can be regarded as loaded flanks. The oppositely facing flanks of the profiles can be regarded as unloaded flanks, since they do not support any significant radial forces in operation.

The flanks of the profiles are interconnected by transition regions which are alternately convex surfaces, which are usually but not always arcuate and are referred to as fillets, and concave surfaces, which are usually but not always arcuate and are commonly known as corners.

The fillets are regions of high stress concentration.

Conventionally, firtree profiles on turbine blade roots are formed in a grinding process, which takes the profiles to their final dimension. This process is expensive in terms of machine tool consumables and set-up time. Firtree profiles in turbine discs are commonly formed as slots by broaching. This process allows little flexibility of design during the development of the turbine, since broach tooling is specific to the slot being machined. The manufacture of broach tooling has long lead times, and consequently it is costly and time-consuming to modify the tooling.

Electric discharge machining (EDM) is a known machining process in which profiles are formed by spark erosion caused by electric discharge between a wire and the workpiece. EDM has not hitherto been considered to be suitable for the manufacture of firtree profiles, because the process creates re-cast layers at the surface of the workpiece which are prone to fatigue failure if subjected to high bending stress.

According to the present invention there is provided a method of forming a firtree profile in or on a component, the firtree profile having surfaces which, in use of the component, comprise a loaded flank and an unloaded flank, the method comprising:
(i) forming an intermediate profile in a first material removing operation; and
(ii) subsequently removing material from the intermediate profile by a second material removing operation to provide the finished firtree profile,
characterised in that either the first material removing operation or the second material removing operation is an electric discharge machining operation which forms a finished surface of the loaded flank.

The other material removing operation may be a mechanical machining operation, such as milling or grinding, or it may be a chemical operation, for example a chemical etching process.

The other material removing operation may produce the finished surface of at least one transition region between adjacent flanks of the firtree profile. The transition region may comprise a concave fillet or a convex corner, which may be truncated.

In addition to the finished surface of the loaded flank, the electric discharge machining operation may also produce the finished surface of at least one of the unloaded flanks.

In one method in accordance with the present invention, the second material removing operation may be the electric discharge machining operation. In another method in accordance with the present invention, the electric discharge machining operation may be the first material removing operation, in which case the second material removing operation may remove a re-cast layer formed by the electric discharge machining operation over at least one region of the firtree profile.

The loaded flank may be formed by the electric discharge machining operation to have a cambered profile in order to localise the bearing load away from a region subject to high stress in operation.

The transition region may comprise a concave fillet or a convex corner, which may be truncated. Many firtree profiles which are suitable to be formed by a method in accordance with the present invention may have a plurality of loaded and unloaded flanks, and consequently there will be a plurality of transition regions, comprising alternating fillets and corners.

The present invention also provides a component having a firtree profile formed by a method as defined above. The component may comprise a rotor disc of a gas turbine engine, for receiving blades or vanes, the firtree profile constituting an internal wall of a recess or slot in the disc. The disc will be provided with a plurality of such recesses for receiving respective blades or vanes.

Alternatively, the component may comprise a blade or a vane for a gas turbine engine, the firtree profile comprising an external surface of an attachment portion of the blade or vane.

Figure 2:
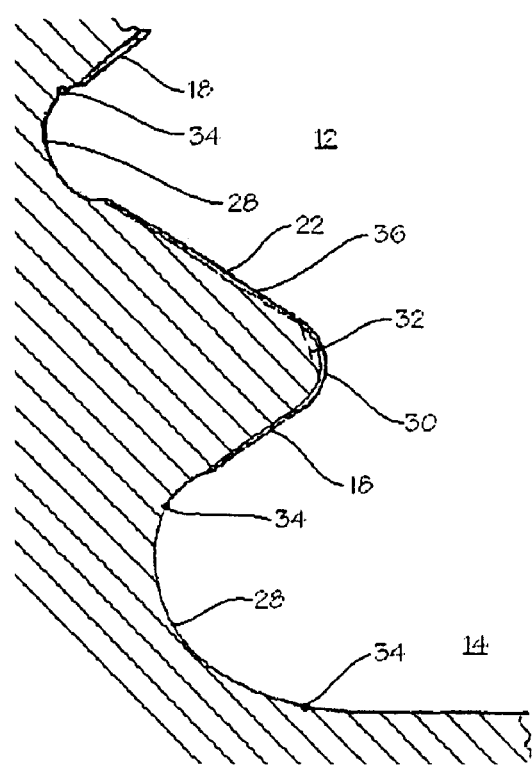

For a better understanding of the present invention, and to show more clearly how it may be carried into effect, reference will now be made, by way of example, to the accompanying drawings, in which:

FIG. 1 is a fragmentary sectional view of a turbine blade retained in a turbine disc by means of a complementary firtree profiles; and FIG. 2 is an enlarged partial view of the firtree profile of the disc.

FIG. 1 shows a turbine disc 2 provided with a blade 4. The blade 4 comprises an aerofoil portion 6 and a root portion 8 having a firtree profile. A shroud portion 10 projects laterally from the blade 4. It will be appreciated that the disc 2 is provided with a plurality of the blades 4, the shroud portions 10 of adjacent blades abutting one another to form a continuous circumferential shroud at the radially inner end regions of the aerofoil portions 6.

The disc 2 is provided with a recess 12 which has a firtree profile that is generally complementary to that of the blade root 8. At the base of the recess 12 there is a bucket groove 14.

In operation, rotation of the disc 2 causes the blade 4 to be subjected to radially outwards loading which is supported by loaded flanks 16, 18 of the firtree profiles of, respectively, the blade root 8 and the recess 12. Thus, for the blade 8, the loaded flanks 16 are those which face in a direction having a radially outward component. For the recess 12, the loaded flanks 18 are those which face in the direction having a radially inwards component. The firtree profiles also have unloaded flanks 20, 22 respectively, which, for the blade 4, are the flanks facing in a direction having a radially inwards component and which, for the recess 12, are the flanks facing in a direction having a radially outwards component.

Adjacent loaded and unloaded flanks 16, 20 of the blade 4 are interconnected alternately by concave fillets 24 and convex corners 26. Similarly, adjacent loaded and unloaded flanks 18, 22 of the recess 12 are interconnected by transition regions in the form of concave fillets 28 and convex corners 30. The corners 30 may be truncated, for example by removing at least part of the arcuate surface as indicated in FIG. 2 at 32.

In operation, very high loads are transferred from the loaded flanks 16 of the blade 4 to the loaded flanks 18 of the recess 12. These create high bending stresses at the fillets 24, 28 with particularly high stress points occurring at regions 34. However, because the transition regions 24, 26, 28 and 30 do not make face-to-face contact with one another, they do not need to be formed to high tolerances. By contrast, the loaded and unloaded flanks 16, 18, 20, 22 are not subjected to high bending stresses, but nevertheless have to be formed to tight tolerances in order to ensure that loads are distributed in a desired manner over the firtree profiles.

In accordance with the present invention, the firtree profiles are formed in two stages, one of which utilises an electric discharge machining operation which forms the finished surfaces of the loaded flanks 16, 18. The other stage may utilise a different material removal operation, for example mechanical milling or grinding, or chemical etching, to form the finished surfaces of the fillets 24, 28. Specific methods of forming the firtree profile will now be described with reference to FIG. 2. Although FIG. 2 shows the firtree profile of the recess 12 in the disc 2, it will be appreciated that the same method can be used to form the firtree profile on the root 8 of the blade 4.

In one method of forming the recess 12 in the disc 2, an initial machining operation is conducted to form an intermediate profile. The initial machining operation may be carried out using a milling cutter and/or a grinding wheel to form the finished surfaces of the fillets 28, but leaving surplus material at the loaded and unloaded flanks 18, 22 and the corners 30. In a subsequent stage, the loaded and unloaded flanks 18, 22 and the corners 30 are formed to their final dimensions by an electric discharge machining operation, for example EDM wire cutting. Electric discharge machining provides a highly accurate finished surface, but has the effect of creating a re-cast layer 36, which is typically 0.05 mm thick, and which contains impurities such as copper and beryllium which are transferred to the material of the component from the wire electrode used in the electric discharge machining process.

The re-cast layer 36 consequently has a reduced fatigue margin. However, because the fillets 28, and particularly the high stress regions 34, have their profiles formed by the machining operation, no re-cast layer is present at these regions. Consequently, the fatigue life of the highly stressed regions is maintained, while the regions such as the loaded flanks 18 are finished to tight tolerances.

Although, in FIG. 2, the unloaded flank 22 and the corner radius 30 are shown as being formed by electric discharge machining, so that they have the re-cast layer 36, it would be possible for these regions to be formed to their final dimensions by the initial machining process.

In an alternative method, the intermediate profile is formed by an electric discharge machining process, and subsequently a milling or grinding process is performed on the intermediate profile, to finish the highly stressed regions, such as the fillets 28 to their final dimensions. It will be appreciated that the grinding or milling process could also remove the re-cast layer 36 from the corners 30, the unloaded flanks 22 and the bottom of the bucket groove 14.

In many cases, it is preferable for the milling or grinding process to take place before the electric discharge machining process. This is because the electric discharge machining process has little effect on the stability of the geometry of the firtree profile, since it causes insignificant release of residual stresses. However, if the milling or grinding process takes place after the electric machining process, the release of residual stresses could cause spring-back of the material of the component, causing a loss of tolerance control at the regions, such as the loaded flanks 16, 18, where tight tolerances are required.

In operation of the disc 2 with blades 4 attached, the bearing loads supported by the loaded flanks 16, 18 will produce a compressive stress at the respective surface, in the re-cast layer 36. In order to avoid premature fatigue failure, it is important that the reacting sub-surface tensile stresses in the material of the component arise either below the re-cast layer 36, or away from the ends of the re-cast layer 36, in other words within the fillets 28.

It is therefore important that careful modelling and analysis is performed to ensure that the electric discharge machining re-cast layer 36 is always in compression or low tensile stress in all operating conditions of the engine in which the disc 2 and blades 4 are installed. For example, the loaded flanks 16, 18 may be cambered (for example curved as viewed in the plane of FIG. 2) with the radius of curvature of the camber selected so as to ensure that high tensile stresses are generated only at regions where the re-cast layer 36 is absent. Similarly, the shape of the fillets 28 can be controlled to ensure that high stress regions, such as the regions 34, are situated within it. The fillets 28 need not necessarily be a simple arcuate shape, but can take other forms in order to control the position of high stress regions.

The stresses generated within the material are likely to be sensitive to the tolerance of the shapes of the fillets 28 and the camber on the loaded flanks 16, 18. Also, the depth of the electric discharge machining re-cast layer 36 is likely to be sensitive to the tolerance required and the specific machining process used. It may, therefore, be necessary to inspect finished components carefully to ensure that the re-cast layer has been removed from high-stress regions, and particularly from within the fillets 24, 28.

The invention claimed is:

1. A method of forming a firtree profile in or on a component, the firtree profile having surfaces which, in use of the component, comprise a loaded flank and an unloaded flank, the method comprising:
   (i) forming an intermediate profile in a first material removing operation; and
   (ii) subsequently removing material from the intermediate profile by a second material removing operation to provide a finished firtree profile;
   wherein either the first material removing operation or the second material removing operation is an electric discharge machining operation which forms a finished surface of at least one of the loaded flank and the unloaded flank, and
   an other material removing operation of one of the first material removing operation and the second material removing operation forms a finished. surface of the remaining surfaces of the firtree profile.

2. A method as claimed in claim 1, wherein the other material removing operation comprises a mechanical machining operation.

3. A method as claimed in claim 1, wherein the other material removing operation comprises a chemical etching process.

4. A method as claimed in claim 1, wherein the loaded flank is formed by the electric discharge machining operation to have a cambered profile.

5. A method as claimed in claim 1, wherein the first material removing operation comprises the electric discharge machining operation.

6. A method as claimed in claim 5, wherein the second material removing operation removes a re-cast layer formed by the electric discharge machining operation.

7. A method as claimed in claim 1, wherein the other material removing operation produces the finished surface of a transition region between adjacent flanks.

8. A method as claimed in claim 7, wherein the transition region comprises a concave fillet.

9. A method as claimed claim 7, wherein the transition region comprises a convex corner.

10. A method as claimed in claim 9, wherein the convex corner is truncated.

* * * * *